United States Patent [19]

Park et al.

[11] Patent Number: 5,330,568

[45] Date of Patent: Jul. 19, 1994

[54] LOW SOFTENING POINT HOMOPOLYPROPYLENE WAX

[75] Inventors: Vernon K. Park; Randal R. Ford; Robert P. Allen, all of Longview, Tex.

[73] Assignee: Eastman Chemical Company, Kingsport, Tenn.

[21] Appl. No.: 966,788

[22] Filed: Oct. 26, 1992

[51] Int. Cl.$^5$ .............................................. C08L 91/06
[52] U.S. Cl. .................................. 106/270; 106/271; 106/272
[58] Field of Search ..................... 106/270, 271, 272

[56] References Cited

U.S. PATENT DOCUMENTS

| | | | |
|---|---|---|---|
| 3,178,381 | 4/1965 | Mills et al. | 106/270 |
| 3,312,648 | 4/1967 | Guttman et al. | 106/270 |
| 3,423,384 | 1/1969 | Hagemeyer et al. | 528/41 |
| 4,082,558 | 4/1978 | Nobuo | 106/270 |
| 4,426,229 | 1/1984 | Bolton et al. | 106/271 |
| 4,529,132 | 7/1985 | Hobes et al. | 106/271 |
| 4,661,163 | 4/1987 | Berke et al. | 106/271 |
| 4,917,734 | 4/1990 | Demay et al. | 106/270 |
| 4,917,982 | 4/1990 | Tomono et al. | 430/99 |
| 4,921,771 | 5/1990 | Tomono et al. | 430/110 |
| 4,988,598 | 1/1991 | Tomono et al. | 430/99 |
| 4,997,739 | 3/1991 | Tomono et al. | 430/110 |
| 5,004,666 | 4/1991 | Tomono et al. | 430/110 |
| 5,023,134 | 6/1991 | Bezigian et al. | 106/270 |
| 5,023,158 | 6/1991 | Tomono et al. | 430/99 |

FOREIGN PATENT DOCUMENTS

| | | | |
|---|---|---|---|
| 0275909 | 1/1965 | Australia | 106/270 |
| 49-011848 | 3/1974 | Japan | 106/270 |

OTHER PUBLICATIONS

"Textbook of Polymer Science", Billmeyer, p. 9, 1962.
"Control Degradation of Polypropylene", C. Tzoganakis et al, Chemical Engineering Process 84 (11), pp. 47–49, Nov. 1988.

*Primary Examiner*—Anthony Green
*Attorney, Agent, or Firm*—Mark A. Montgomery

[57] ABSTRACT

A low molecular weight crystalline homopolypropylene wax of low softening point is disclosed. This homopolypropylene wax is prepared from high molecular weight crystalline polypropylene by thermal degradation in the presence of a relatively high amount of peroxide.

20 Claims, No Drawings

LOW SOFTENING POINT HOMOPOLYPROPYLENE WAX

FIELD OF THE INVENTION

This invention relates to a novel low molecular weight crystalline polypropylene wax of reduced softening point and process for the production thereof.

BACKGROUND OF THE INVENTION

Low molecular weight polypropylenes are known (see Control Degradation of Polypropylene C. Tzoganakis, et al, Chemical Engineering Progress 84 (11), pp. 47-49, November, 1988). Low molecular weight polypropylene waxes are generally prepared from high molecular weight polypropylene by degradation. The degradation of high molecular weight polypropylene to produce low molecular weight polypropylene waxes are generally divided into two categories: thermal degradation and peroxide promoted degradation. High molecular weight polypropylenes having flow rates of 0.1 to 30 can be degraded thermally with a peroxide (known as controlled rheology) to produce lower molecular weight polypropylenes having higher flow rates (50 to 800 determined according to ASTM D1238-57T). Although the flow rates are higher than the starting flow rates, these polypropylenes are still plastic grade polypropylenes. Low molecular weight polypropylene waxes generally have flow rates much higher than 800 but are classified by Brookfield Thermocel Viscosity.

Flow rates of 0.1 to 30 generally correspond to molecular weights (number average) of 200,000 to 300,000 whereas flow rates of 50 to 800 correspond roughly to molecular weights of 80,000 to 100,000.

Propylene-ethylene copolymer waxes of low molecular weight (2000–6000 $M_n$) having a ring and ball softening point of about 150° C. are known. U.S. Pat. No. 4,988,598, discloses a toner composition for use in developing electrostatic images. The toner composition in this patent contains a thermoplastic styrene polymer, a coloring agent, and a low molecular weight propylene-ethylene copolymer wax. Low molecular weight propylene-ethylene copolymer wax can be prepared by thermal degradation of a high molecular weight propylene-ethylene copolymer without peroxide. However, low molecular weight homopolypropylene wax prepared by thermal degradation has a ring and ball softening point well above 155° C. and does not provide adequate properties such as melt fixing temperature for toner applications. Additionally, the thermal degradation of homopolypropylene to produce low molecular weight homopolypropylene wax of lower ring and ball softening point results in low molecular weight homopolypropylene wax melt viscosities that are too low (below 30 cP at 190° C.).

Although low molecular weight crystalline propylene-ethylene copolymer waxes of lower ring and ball softening point are known, it would, however, be very desirable to be able to produce low molecular weight crystalline homopolypropylene waxes having lower ring and ball softening points (RBSP) due to lower cost and convenience in manufacture.

SUMMARY OF THE INVENTION

The composition according to the present invention comprises a low molecular weight crystalline polypropylene wax having a number average molecular weight of below 10,000, a ring and ball softening point below about 155° C., a comonomer content of less than 1 mole percent, and a melt viscosity of at least 30 cP at 190° C.

The process for producing the low molecular weight crystalline polypropylene wax of low softening point comprises degrading, in the presence of about 1 to 15 weight percent peroxide, a high molecular weight crystalline polypropylene at a temperature of about 190° to 250° C.

DETAILED DESCRIPTION OF INVENTION

Applicants have unexpectedly discovered that a low molecular weight crystalline homopolypropylene wax having a low RBSP and a high melt viscosity can be produced by the thermal degradation of high molecular weight crystalline homopolypropylene in the presence of peroxide.

The homopolypropylene wax of the present invention is a homopolymer or essentially a homopolymer and has less than one mole percent comonomer, preferably less than 0.5 mole percent comonomer, with a comonomer content at or near zero mole percent being most preferred.

Low molecular weight polypropylene wax - refers to polymers that are similar to waxes having molecular weights ($M_n$) less than 10,000. (See Textbook of Polymer Science, page 9, Billmeyer; 1962). Wax usually refers to a substance that is a plastic solid at ambient temperature and, on being subjected to moderately elevated temperatures, becomes a low viscosity liquid. Because it is plastic, wax usually deforms under pressure without the application of heat. The molecular weight of these low molecular weight homopolypropylene waxes is preferably between 1,000 and 7,000 ($M_n$), more preferably between 1500 and 3000.

The important properties of the low molecular weight crystalline homopolypropylene wax of the present invention are the ring and ball softening point and melt viscosity. Procedures for determining each are given in the beginning of the Examples. The RBSP of the low molecular weight crystalline homopolypropylene wax of the present invention is below about 155° C. preferably about 140° to 155° C., more preferably about 145° to 153° C., with a RBSP of 146° to 150° C. being most preferred. A RBSP much above about 155° C. does not provide adequate properties such as melt fixing temperature in toner applications.

The melt viscosity of the low molecular weight crystalline homopolypropylene wax is at least 30 cP at 190° C. more preferably between 40 and 1000 cP at 190° C. with an inherent viscosity of about 50 to 300 cP at 190° C. being most preferred. A melt viscosity much below 30 cP at 190° C. would be too thin to manufacture and use.

The low molecular weight crystalline homopolypropylene wax, according to the present invention, is produced from a high molecular weight crystalline polypropylene homopolymer. The process of producing the low molecular weight crystalline homopolypropylene wax of low softening point comprises degrading in the presence of about 1 to 15 weight percent peroxide, a high molecular weight crystalline homopolypropylene at a temperature of about 190° to 250° C. for about 2 to 90 minutes. The exact temperature of the reaction generally depends upon the half-life of the peroxide and the viscosity of the crystalline homopolypropylene in the melt phase. Higher temperatures not only lower the viscosity of the higher molecular weight polypropylene but also lower the half-life of the peroxide. A reaction temperature much below 190° C. generally is too slow and too inefficient to be significantly affective due to longer half-life of the peroxide and poor mixing of the peroxide with viscous polypropylene. A reaction temperature much above 250° C., however, degrades the peroxide too fast to be useful since the peroxides half life is dramatically reduced at temperatures above 250° C. Within this temperature range, the preferred temperature ranges not only depend upon the polypropylene molecular weight and peroxide half-life but also depend upon which type of apparatus is used to degrade the high molecular weight polypropylene. However, a preferred temperature range is about 200° to 240° C. If an extruder is used as the degradation apparatus the more preferred temperature is about 230° to 240° C. whereas the preferred temperature in a stirred reactor is about 210° to 230° C.

The degradation time or residence time in the degrading apparatus is generally between 2 and 90 minutes, however, this time is preferably between 2 and 3 minutes in a screw extruder and about 10 to 30 minutes in a stirred reactor.

Peroxides used in the degradation process of the present invention can be any peroxide with a reasonable half-life at the process temperature that is compatible with the polypropylene. However, the preferred peroxides are the dialkyl peroxides, ROOR, wherein R=alkyl. Examples of suitable diakyl peroxides include ditertiary butyl peroxide (DTBP), dicumyl peroxide, and Lupersol 101, a dimer of DTBP. These peroxides have a half-life which is effective in the degradation reaction under the temperatures used for this process in the 190° to 250° C. range, or in the preferred range of 200° to 240° C. DTBP is the most preferred peroxide due to its compatibility and suitable half-life. It has a half-life of 30 seconds at 200°/C. and <2 seconds at 240° C. The peroxide is preferably incrementally added in multiple zones in the degradation apparatus. The amount of peroxide used in the degradation process according to the present invention is about 1 to 15 weight percent, more preferably about 2 to 12 weight percent, with the most preferred amounts of peroxide depending upon the particular temperature and degradation apparatus. In a screw extruder at the more elevated temperature the half-life of the peroxide is reduced thus there is the need for higher amounts of peroxide added at different points along the extruder to insure adequate and uniform degradation. This amount of peroxide in a screw extruder is more preferably about 8 to 12 weight percent. The amount of peroxide added incrementally into a stirred reactor is more preferably about 2 to 7 weight percent.

The peroxide can be added with or without a solvent carrier but the use of a solvent is preferred. It is believed that any hydrocarbon solvent would be useful as a peroxide carrier in the present invention. However, the higher boiling hydrocarbon solvents are preferred due to safety reasons. Note: The boiling point of the solvent should not be much above 230° C. since removal from the product would be difficult.

High molecular weight crystalline or isotactic polypropylene used in the present invention refers to polypropylene produced with anionic coordination catalysts or Ziegler-Natta catalysts which yield stereospecific or stereoregular polypropylene as disclosed in U.S. Pat. No. 3,423,384, the disclosure of which is incorporated herein by reference in its entirety. The stereoregular or crystallinity of the polypropylene can be defined by the xylene solubility index. Most commercial stereoregular polypropylenes have xylene soluble indexes ranging from 1.5 to 10 percent. The xylene soluble index is related to the catalyst used and to the molecular weight. The xylene soluble index is defined as the amount of polypropylene that is soluble after dissolving 3 g of polypropylene in 300 ml of xylene at elevated temperature; cooled to precipitate the stereoregular polypropylene; filtered and the xylene evaporated to dryness and the residue weighed. The residue weight divided by the initial weight times 100 provides the xylene soluble index.

For the purpose of this invention, high molecular weight crystalline polypropylenes having xylene soluble indexes of 1.5 to 10 percent can be used. This corresponds to a percent crystallinity of 90 to 99.5. The high molecular weight crystalline propylene homopolymer used in the present invention preferably has a crystallinity of at least 90 percent, more preferably about 94 to 98 percent with a percent crystallinity of at least 96 being most preferred. According to the present invention a polypropylene starting material that is highly crystalline results in a highly crystalline polypropylene wax.

The number average molecular weight ($M_n$) range of the high molecular weight polypropylene used in the present invention can generally vary from 20,000 to 500,000 at flow rates of 0.1 to 800. Flow rate is related to the molecular weight and is measured by an extrusion plastometer (ASTM - D1238-575). The preferred flow rate range is 12 to 800. High molecular weight crystalline polypropylenes having low flow rates of 0.1 to <12 are more difficult to extrude thereby reducing production rates. The lower molecular weight polypropylenes having flow rates greater than 800 can be used but are not commercially available.

The low molecular weight crystalline polypropylene wax of low softening point is useful in many applications including release component in toners, processing aid for plastic and rubber processing, paper coating, printing ink, paint or lacquer additive, hot melt adhesive additive, and wax modifier.

Toner compositions according to the present invention contain, among other possible additives, the polypropylene wax, coloring agent, and thermoplastic resin. In the toner composition, any suitable pigments or dyes can be used as the coloring agent specified in the present invention. Suitable examples, include carbon black, migrosin dyes, Anilin Blue, Calco Oil Blue, Chrome Yellow, Ultramarine Blue, Du Pont Oil Red, Qinoline Yellow, Methylene Blue Chloride, Phthalocyanine Blue, Malachaite Green Oxalate, lampblack, Rose Bengal and mixtures thereof. The amount of any of these coloring agents to be contained in the present toner should be sufficient to color the toner so that a visible image will be formed at the time of development.

Thermoplastic resins used in a toner composition of the present invention include homopolymers or copolymers of the following monomers: styrene; vinyl naphthalene; such vinyl esters, for example, as vinyl chloride, vinyl bromide, vinyl fluoride, vinyl acetate, vinyl propionate, vinyl benzoate and vinyl butyrate; such esters of a-methylene aliphatic monocarboxylic acid, for example, as methyl acrylate, ethyl acrylate, n-butyl acrylate, isobutyl acrylate, dodecyl acrylate, n-octyl acrylate, 2-chloroethyl acrylate, phenyl acrylate, methyl a-chloroacrylate, methyl methacrylate, ethyl methacrylate and butyl methacrylate; acrylonitrile;

methacrylonitrile; acrylamide; such vinyl ethers, for example, as vinyl methyl ether, vinyl isobutyl ether and vinyl ethyl ether; such vinyl ketones, for example, as vinyl methyl ketone, vinyl bexyl ketone and methyl isopropenyl ketone; and such N-vinyl compounds, for example, a N-vinyl pyrrole, N-vinyl carbazole, N-vinyl indole and N-vinylpyrrodidene. Alternatively included are, for example, such non-vinyl type thermoplastic resins as resin-modified phenol formalin resins, oil-modified epoxy resins, polyurethane resins, cellulose resins and polyester resins and mixtures of one or more of the above resins.

The following examples are presented to illustrate the present invention but should not be interpreted as a limitation upon the reasonable scope thereof.

EXAMPLES

Polypropylene, like many other polymers, does not have a sharp melting point but melts over a range of temperatures. For this reason, the ring and ball softening point is reported for low-molecular-weight polypropylene resins. The ring and ball softening point is defined as the temperature at which a disk of a given sample, held in a horizontal position, is forced downward a distance of one inch under the weight of a standard steel ball as the sample is heated at a prescribed rate in a glycerin bath. The ring and ball softening point is the temperature at which the ball drops through the ring. The RBSP of the polypropylene waxes in these examples was determined according to ASTM E28-67T using an automatic RBSP apparatus (ATPEM).

Melt viscosity is controlled within specific limits. The viscosity of the molten polypropylene at a given temperature, 190° C., is determined with the Brookfield Thermosel Viscometer. The melt viscosity in centipoise is calculated according to constant factors supplied with the Brookfield instrument. The melt viscosity of the polypropylene waxes in these examples was determined according to ASTM D3236.

EXAMPLE 1

Five hundred grams of crystalline polypropylene having a flow rate of 120° at 230° C. (from Eastman Chemical Company (ECC) under the tradename Tenite P9-018) were placed in a 2-liter resin flask fitted with an anchor-type stirrer, thermowell and attachment for the later addition of a 1/1 mixture of peroxide (ditertiary butyl peroxide (DTBP)in Isopar M Mineral Spirits) and a nitrogen blanket. The flask was placed in a heater mantle and heated. When the polypropylene became molten, the temperature was held at 220° C. Then 15 g DTBP (3%, based on polypropylene) in Isopar M was added incrementally over 30 minutes. After the complete addition of peroxide, a nitrogen purge was applied to remove low boiling residuals.

The degraded polypropylene wax was then poured into a silicone lined container and cooled. Properties of viscosity, RBSP, etc. were then measured as shown in Table I. The RBSP of this wax was 146° C.

EXAMPLE 2

Control

Four hundred and fifty grams of the crystalline polypropylene used in Example 1 were placed in a 2-liter resin flask fitted with an anchor stirrer, thermowell, and a nitrogen blanket. The flask was placed in a heater mantle and heated. When the polymer melted, the temperature was held at 370° C. and the polymer was stirred for 20 minutes. The flask was then purged with nitrogen and the molten wax poured into a silicone lined container. Properties are shown in Table I. The softening point of this wax was 159° C. as compared to 146° C. in Example 1.

EXAMPLE 3

Control

Five hundred grams of crystalline propylene-ethylene copolymer (containing 3.2% ethylene having a flow rate of 11 at 230° C. prepared by a gas-phase process using an anionic coordination catalyst) were placed in a 2-liter resin flask fitted with an anchor stirrer, thermowell and nitrogen blanket. The flask was placed in a heater mantle and heated. When the temperature reached 370° C., it was maintained at this temperature while the polymer was being stirred for 20 minutes. The flask was then purged with nitrogen and the molten wax was poured into a silicone lined container and cooled. Properties were then measured. The results are shown in Table I. The ring and ball softening point of this wax was 148° C. This indicates that a propylene-ethylene copolymer can be degraded thermally to a wax having a lower RBSP without peroxide.

EXAMPLE 4

Crystalline polypropylene having a flow rate of 11 at 230° C. (from ECC under the tradename Tenite P4-007) was fed into a Berstorff 43 l/d twin screw extruder (having 8 heating zones) at a temperature of 240° C. at a feed rate of 10 pounds per hour. Ditertiary butyl peroxide in Isopar M was injected into Zones 3, 5 and 7 at addition rates of 2, 4 and 4 weight % respectively, relative to the polypropylene rate. A total of 10 weight percent peroxide was used. Low boiling residuals were removed by a vacuum attachment at the end of the extruder. Evaluation of the degraded polypropylene showed it had a viscosity of 160 cP at 190° C. and a ring and ball softening point of 146° C. This demonstrates that an extruder process can be used to make a low softening point polypropylene wax.

TABLE I

| PROPERTY | Example 1 Peroxide Degraded pp(a) | Example 2 Thermally Degraded pp(a) | Example 3 Thermally Degraded P/E Co-polymer(b) | Example 4 Peroxide Degraded pp(c) in Extruder |
|---|---|---|---|---|
| Viscosity | | | | |
| @ 160° C., cp. | 182 | — | 219 | 318 |
| @ 190° C., cp. | 96 | 137 | 118 | 166 |
| RBSP, °C. | 146 | 159 | 148 | 146 |
| DSC M.P. | | | | |
| Tm, °C. | 144 | 158 | 149 | * |
| Tc, °C. | 97 | 110 | 102 | * |
| Molecular Weight | | | | |
| Mw | 6600 | 7800 | 7300 | * |
| Mn | 2100 | 2900 | 2800 | * |
| Mw/Mn | 3.1 | 2.7 | 2.6 | * |
| Density, g. cc. | 0.86 | 0.86 | 0.86 | 0.86 |

TABLE I-continued

PROPERTIES OF LOW MOLECULAR WEIGHT POLYPROPYLENES

| PROPERTY | Example 1 Peroxide Degraded pp(a) | Example 2 Thermally Degraded pp(a) | Example 3 Thermally Degraded P/E Co-polymer(b) | Example 4 Peroxide Degraded pp(c) in Extruder |
|---|---|---|---|---|
| % Ethylene | — | — | 3.0 | — |

(a)Homopolypropylene—Flow Rate = 120
(b)Propylene-ethylene copolymer—Flow Rate = 11
(c)Homopolypropylene—Flow Rate = 11
(*)Undetermined

We claim:

1. A composition comprising a low molecular weight crystalline homopolypropylene wax having a number average molecular weight below 10,000, a ring and ball softening point below about 155° C., a comonomer content of less than 1 mole percent and a melt viscosity of at least 30 cP at 190° C. wherein said low molecular weight crystalline homopolypropylene wax is produced from a high molecular weight crystalline polypropylene homopolymer containing less than one percent comonomer having a number average molecular weight from 20,000 to 500,000 and a flow rate of 0.1 to 800.

2. The composition according to claim 1 wherein said comonomer content is less than 0.5 weight percent.

3. The composition according to claim 2 wherein said molecular weight is between 1,000 and 7,000.

4. The composition according to claim 1 wherein said ring and ball softening point is about 145° to 153° C.

5. The composition according to claim 1 wherein the low molecular weight crystalline homopolypropylene wax is produced from a high molecular weight crystalline polypropylene homopolymer having a flow rate of 12 to 800.

6. The composition according to claim 5 wherein the crystallinity of said high molecular weight crystalline polypropylene homopolymer is at least 90 percent as determined by xylene solubles content.

7. The composition according to claim 1 further comprising at least one coloring agent and at least one thermoplastic resin.

8. A process for producing a crystalline homopolypropylene wax having a number average molecular weight below 10,000 and a ring and ball softening point below 155° C. comprising degrading in the presence of about 1 to 15 weight percent peroxide, a crystalline polypropylene homopolymer having less than one mole percent comonomer and a number average molecular weight from 20,000 to 50,000 at a temperature of about 190°-250° C.

9. The process according to claim 8 wherein the amount of peroxide is about 2 to 12 weight percent.

10. The process according to claim 8 wherein the degrading of said crystalline polypropylene homopolymer is conducted in a screw extruder and said peroxide is injected into the polypropylene at a plurality of points along the screw extruder.

11. The process according to claim 10 wherein the temperature of said polypropylene homopolymer is about 230° to 240° C. and the amount of peroxide injected into said polypropylene homopolymer is about 8 to 12 weight percent.

12. The process according to claim 8 wherein the degrading of said crystalline polypropylene homopolymer is conducted in a melt phase in a stirred reactor.

13. The process according to claim 12 wherein the temperature of said polypropylene homopolymer is about 210° to 230° C. and the amount of peroxide used in said stirred reactor is about 2 to 7 weight percent.

14. The process according to claim 12 wherein said peroxide is added incrementally into said stirred reactor.

15. The process according to claim 8 wherein said temperature is about 200° to 240° C.

16. The process according to claim 8 wherein said peroxide is a dialkyl peroxide.

17. The process according to claim 16 wherein said peroxide is ditertiary butyl peroxide.

18. The process according to claim 17 wherein said peroxide is present in a hydrocarbon solvent.

19. The composition according to claim 1 wherein said melt viscosity is between 40 and 1000 cP at 190° C.

20. The composition according to claim 19 wherein said melt viscosity is between 50 and 300 cP at 190° C. and said ring and ball softening point is about 146° to 150° C.

* * * * *